United States Patent Office  3,589,932
Patented June 29, 1971

3,589,932
PROCESS OF COATING METAL SUBSTRATES AND RESULTING COATED METAL SUBSTRATES
Harold A. Wittcoff and Kenneth B. Stokes, Minneapolis, Minn., assignors to General Mills, Inc.
No Drawing. Filed Mar. 13, 1969, Ser. No. 807,124
Int. Cl. B44d 1/14, 1/34
U.S. Cl. 117—75         11 Claims

ABSTRACT OF THE DISCLOSURE

A composite coating of improved chip resistance is prepared by coating a metal substrate with a composition comprising an organic polyisocyanate and a ketimine or aldimine blocked polyamine or organic isocyanate derivative thereof and then with a heat curable acrylic coating composition. At least 5% of the isocyanato groups of the reactants in the first coating composition must be from the polyisocyanates prepared from polymerized fat acids.

---

The present invention relates to the process of coating metals and to the resulting coated metal substrates. More particularly, it relates to such a process wherein the metal substrate is coated with certain polyurea forming curable compositions and then with one or more coats of a heat curable acrylic coating composition. It further relates to the composite coated metal substrate.

Acrylic finishes, such as those used in the automotive and appliance industries, are hard and durable, but are not especially resistant to chipping. Gravel impacts on an automotive finish cause chipping to expose the metal substrate to the elements with subsequent corrosion thereof. This chipping problem is especially serious on certain parts of the automobiles, namely rocker panels, the front portions of the hoods and front fenders and the doors (chipped by hitting objects on opening). Increasing the coating thickness of the acrylic finishes actually reduces chip resistance.

It is an object of the present invention to provide composite coatings for metal substrates having improved chip resistance. A further object of our invention is to provide a process for coating metal substrates to yield coatings having improved chip resistance. These and other objects will become apparent from the following detailed description.

We have now discovered that metal substrates can be coated with a composite coating of improved resistance to chipping. The substrate is coated with a polyurea forming curable composition comprising (1) certain polyisocyanates or combinations of polyisocyanates and (2) aldimine or ketimine blocked polyamines or organic isocyanate derivatives thereof. Such coating step is then followed by application of one or more coats of a heat curable acrylic coating composition. The composite coated metal substrate retains the resistance to marring and other properties of the acrylic enamel while having greatly improved chip resistance.

The useable polyamines include those having at least two primary amine groups. Aliphatic polyamines are the preferred reactants for preparation of the aldimines and ketimines. The reaction of carbonyl compounds with the primary amine groups of the polyamines can be illustrated as follows:

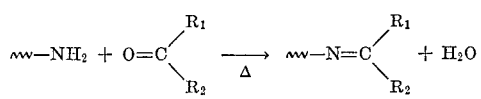

The useful carbonyl compounds may have the following structural formula:

where $R_1$ and $R_2$ are hydrogen or organic radicals with the proviso that at least one of same must be an organic radical. When organic, the radicals are preferably short chain alkyl groups (1 to 6 carbon atoms) or the phenyl group. Preferred carbonyl compounds are low molecular weight ($C_2$–$C_8$) aldehydes or ketones that are volatile so that an unreacted excess thereof may easily be removed by conventional distillation practices when the reaction is completed or as it proceeds. Such volatile compounds are also preferred so that when the blocked polyamine is mixed with the polyisocyanate reactant and exposed to moisture, the freed aldehyde or ketone is removed through its volatility from the reaction mixture.

Preferred examples of the carbonyl compounds include such aldehydes and ketones as acetone, methylethyl ketone, diethyl ketone, methylisopropyl ketone, methylisobutyl ketone, methyl-n-butyl ketone, methyl-tert-butyl ketone, ethylisopropyl ketone, acetaldehyde, benzaldehyde, propionaldehyde, butyraldehyde, isobutyraldehyde, and the like (i.e. including hexanone and hexanal). An especially preferred compound is methylisobutyl ketone, i.e.

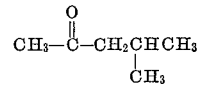

Preferred aliphatic polyamines are those having the structures:

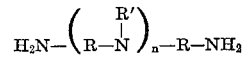

or

where R is a difunctional aliphatic group containing from 2–48 carbon atoms, R' is an aliphatic group containing 1–24 carbon atoms and $n$ is an integer of from 0–20. Representative R radicals are ethylene, propylene, trimethylene, butylene, pentylene, octylene, octadecylene, and the like. Representative R' radicals are methyl, propyl, butyl, decyl, hexadecyl, hexenyl, octenyl, tridecenyl, octadecyl, undecyl and the like. Inert or non-interfering groups such as Cl, nitro and the like may be present on R and/or R'. Illustrative of the preferred compounds are the following alkylene polyamines: ethylene diamine, diethylene triamine, triethylene tetraamine, dipropylene triamine and mixed polyalkylene polyamines such as N,N'-bis(gamma-aminopropyl)-ethylene diamine. Especially preferred compounds are those wherein R is a short chain alkylene group of 2 to 6 carbon atoms and $n$ is 2 or less.

While any of the aldimine or ketimine blocked polyamines as above-described are useful in the polyurea forming composition, it is especially preferred to use certain derivatives of such blocked polyamines wherein the same contain one or more free secondary amine groups. Such derivatives are prepared from the polyamine compounds having at least one free secondary amine group and having the primary amine groups thereof blocked with ketimine or aldimine groups by reacting the same with an organic isocyanate.

Typical polyisocyanates which may be used in preparing the derivatives useful in the present invention include the polymethylene diisocyanates such as ethylenediisocyanate, trimethylene diisocyanate, tetramethylenediisocyanate, pentamethylenediisocyanate, hexamethylenediisocyanate, etc.; other alkylene diisocyanates, such as propylene - 1,2 - diisocyanate, butylene - 2,3 - diisocyanate, etc.; alkylidene diisocyanates, such as ethylidene diisocyanate, butylidene diisocyanate, etc.; cycloalkylene diisocyanates, such as cyclopentylene - 1,3 - diisocyanate, cyclohexylene - 1,4 - diisocyanate, 4,4'-diisocyanate bis-(cyclohexyl)methane, etc.; cycloalkylidene diisocyanates such as cyclopentylidene diisocyanate, cyclohexylidene diisocyanate, etc.; triisocyanates such as 1,2,4-butanetriisocyanate, 1,3,3-pentanetriisocyanate, 1,2,2-butanetriisocyanate, etc.

Examples of araliphatic polyisocyanates which may be used in preparing the derivatives include the following:

p-phenylene-2,2'-bis(ethyl isocyanate),
p-phenylene-3,3'-bis(propyl isocyanate),
p-phenylene-4,4'-bis(butyl isocyanate),
m-phenylene-2,2'-bis(ethyl isocyanate),
1,4-naphthalene-2,2'-bis(ethyl isocyanate),
4,4'-diphenylene-2,2'-bis(ethyl isocyanate),
4,4'-diphenylene ether-2,2'-bis(ethyl isocyanate),
tris(2,2',2''-ethyl isocyanate benzene),
5-chloro phenylene-1,3-bis(propyl-3-isocyanate),
5-methoxy phenylene-1,3-bis(propyl-3-isocyanate),
5-cyanophenylene-1,3-bis(propyl-3-isocyanate) and
5-methyl phenylene-1,3-bis(propyl-3-isocyanate).

Typical aromatic polyisocyanates which may be used include tolyene diisocyanate, m-phenylene diisocyanate, p-phenylene diisocyanate, 1-methyl-2,4-phenylene diisocyanate, naphthylene-1,4-diisocyanate, diphenylene-4,4'-diisocyanate, etc.; aliphatic-aromatic diisocyanates such as xylylene-1,4-diisocyanate, xylylene-1,3-diisocyanate, 4,4'-diphenylenemethane diisocyanate, etc.

A particularly desirable group of polyisocyanates to be employed are derived from polymeric fat acids and have the following idealized structural formula:

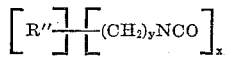

where $y$ is 0 or 1, $x$ is an integer of 2 to about 4 and $R''$ is the hydrocarbon group of polymeric fat acids. Preferably, $x$ is 2. The polyisocyanates of the above formula wherein $y$ is 0 are prepared by converting the polymeric fat acids to the corresponding polymeric acid chlorides, reacting the acid chlorides with a metal azide to form the polymeric acyl azides and then heating the acyl azides to produce the polyisocyanates. This method of preparation can be conveniently illustrated by the following equations (using a dimeric fat acid as an example):

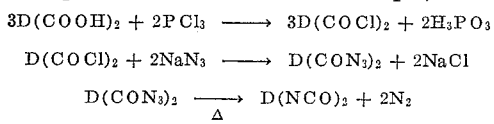

The polyisocyanates wherein $y$ is 1 are prepared by converting the polymeric fat acids to the corresponding polynitriles and then hydrogenating the polynitriles in the presence of ammonia and a catalyst such as Raney nickel to form polyamines. The polyamines are then reacted with phosgene to give the polyisocyanates. This method of preparation can be conveniently illustrated by the following equations (using a dimeric fat acid as an example):

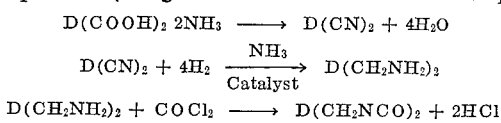

The polymeric fat acids, useful as the starting materials for preparing the above polyisocyanates, are prepared by polymerizing ethylenically unsaturated monobasic carboxylic acids having 16 to 22 carbon atoms or the lower alkyl esters thereof. The preferred aliphatic acids are the mono and polyolefinically unsaturated 18 carbon atom acids. Representative octadecenoic acids are 4-octadecenoic, 5-octadecenoic, 6-octadecenoic (petroselinic), 7-octadecenoic, 8-octadecenoic, cis-9-octadecenoic (oleic), trans-9-octadecenoic (elaidic), 11-octadecenoic (vaccenic), 12-octadecenoic and the like. Representative octadecadienoic acids are 9,12-octadecadienoic (linoleic), 9,11-octadecadienoic, 10,12-octadecadienoic, 12,15-octadecadienoic and the like. Representative octadecatrienoic acids are 9,12,15-octadecatrienoic (linolenic), 6,9,12-octadecatrienoic, 9,11,13-octadecatrienoic (eleostearic), 10,12,14-octadecatrienoic (pseudo-eleostearic) and the like. A representative 18 carbon atom acid having more than three double bonds is moroctic acid which is indicated to be 4,8,12,15-octadecatetraienoic acid. Representative of the less preferred (not as readily available commercially) acids are: 7-hexadecenoic, 9-hexadecenoic (palmitoleic), 9-eicosenoic (gadoleic), 11-eicosenoic, 6,10,14-hexadecatrienoic (hiragonic), 4,8,12,16-eicosatetraenoic, 4,8,12,15,18-eicosapentanoic (timnodonic), 13-docosenoic (erucic), 11-docosenoic (cetoleic), and the like.

The ethylenically unsaturated acids can be polymerized using known catalytic or non-catalytic polymerization techniques. With the use of heat alone, the mono-olefinic acids (or the esters thereof) are polymerized at a very slow rate while the polyolefinic acids (or the esters thereof) are polymerized at a reasonable rate. If the double bonds of the polyolefinic acids are in conjugated positions, the polymerization is more rapid than when they are in the non-conjugated positions. Clay catalysts are commonly used to accelerate the polymerization of the unsaturated acids. Lower temperatures are generally used when a catalyst is employed.

The polyisocyanate derived from these dimeric fat radicals and trimeric fat radicals may be referred to hereinafter by the names dimeryl isocyanate and trimeryl isocyanate. These materials may be produced from mixtures of dimer and trimer fat acid and the relative quantities may be controlled by the degree to which the individual compounds have been isolated in preparing the dimer and trimer fat acids.

Mono-isocyanates may also be employed in preparing the derivatives useful in the present invention. Such isocyanates may be aliphatic, cycloaliphatic, aromatic, araliphatic and the like. Representative of such isocyanates are the following: decylisocyanate, hexadecylisocyanate, heptadecylisocyanate, heneicosylisocyanate, octadecylisocyanate docosylisocyanate, 18-pentatricontane isocyanate, naphthenic isocyanate derived from bicyclic naphthenic acid—i.e. $C_{20}H_{37}COOH$, 1 - stearyloxyphenylene-4-isocyanate, 4-carbooctadecoxy tetrahydrophenyl isocyanate, n-dodecyl isocyanate, 9-octadecenyl isocyanate, cetyl isocyanate, chloesterol adipic acid ester isocyanate, octadecyl oxy acetic acid isocyanate, dodecyl mercaptan acetic acid isocyanate, stearyl glycolic isocyanate, stearyl amino acetic acid isocyanate, urethane N-acetic acid isocyanate, hexadecyl oxy-phenyl isocyanate, octadecyl mercaptopropiono isocyanate, octadecyl mercaptoacetic acid isocyanate, lenulinic dioctadecyl mercaptol isocyanate, and the like.

Preferred organic isocyanates to be employed in preparing the derivatives are the isocyanates having hydrocarbon radicals. Between the mono and polyisocyanates, it is preferred to employ the latter. Particularly preferred compounds are the diisocyanates. Of this class the dimeryl diisocyanates are preferred reactants. Mixtures of the various organic isocyanates may be employed.

The derivatives useful in the present invention are prepared by simply mixing the ketimine or aldimine blocked polyamine with the organic isocyanate. Such mixing is preferably carried out in a reaction environment substantially free of moisture. Where desired, the reaction mixture may be heated although the reaction is normally exothermic to a certain extent. The organic isocyanate is used in an amount about equivalent to the equivalents of free secondary amine groups of the polyamine. In this respect, if the polyamine contains one free secondary amine group and the isocyanate is a monoisocyanate, one mole of the polyamine is reacted with one mole of the isocyanate. If the polyamine contains two free secondary amine groups and the isocyanate is a monoisocyanate, one mole of the polyamine would be reacted with two moles of the isocyanate. If the polyamine has one free secondary amine group and the isocyanate is a diisocyanate, two moles of the polyamine would be reacted with one mole of the diisocyanate. It is thus apparent that the ratio of reactants varies as to the number of free secondary amine groups of the polyamine—i.e. one, two, three or more—and as to whether the isocyanate is mono, di, tri or higher. The derivative may be prepared in the presence of a solvent or diluent if desired. The reaction of the secondary amine group or groups (i.e. >NH) of the polyamine with the isocyanato group (i.e.—NCO) yields a linkage of the following structure:

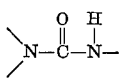

The derivatives are complex materials. In this respect they comprise a residue of a polyamine, 2 or more (preferably less than about 50) ketimine or aldimine blocked primary amine groups and 1 or more (preferably less than about 50) urea groups derived from the secondary amine group or groups of the polyamine and the isocyanate compounds. In some of the preferred and simpler aspects, the derivatives can be defined structurally. Thus when the polyamine has only one free secondary amine group and the isocyanate is mono- or difunctional or when the polyamine has more than one free secondary amine group and the isocyanate is monofunctional, the derivatives can be defined by the following idealized, structural formulae:

I
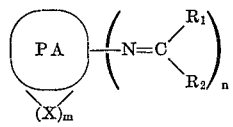

and

II
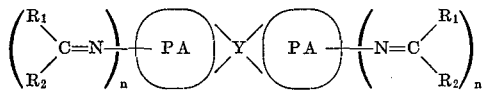

where $R_1$ and $R_2$ are as defined above, $n$ is an integer of at least 2, $m$ is an integer of at least 1, (PA) is the residue of a polyamine exclusive of the ketimine or aldimine blocked primary amine groups and the urea linked secondary amine nitrogen or nitrogens, >X is

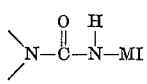

where MI is the residue of a monoisocyanate exclusive of the isocyanato group, and >Y< is

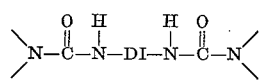

where DI is the residue of a diisocyanate exclusive of the isocyanato groups. Where the polyamine contains two or more secondary amine groups and the isocyanate is di, tri or higher functional, complex mixtures of derivatives tend to be produced. Such mixtures include compounds where two or more polyamine moieties are linked by two or more isocyanate moieties. The derivatives also include those prepared using two or more blocked polyamines and/or two or more different isocyanates.

As indicated above, the process of the present invention includes the coating of the metal substrate with the polyurea forming curable composition comprising the described aldimine or ketimine blocked polyamines or preferably the described derivatives thereof and certain polyisocyanates. Where the first component is the simple aldimine or ketimine blocked polyamine, at least about 50% of the polyisocyanate must be a polyisocyanate derived from polymeric fat acids as above-described, the percent being based on the total number of isocyanato groups—i.e. equivalent percent. Where the first component is the preferred derivative of the aldimine or ketimine blocked polyamine, at least about 50% of the total isocyanate used in the preparation of the derivative and as the second component must be the described polymeric fat acid based polyisocyanate, said percent being based on the total number of isocyanato groups used in the preparation of the derivative and as the second polyisocyanate component. Thus one isocyanate can be used in preparing the derivative and the second component can provide the needed polymeric fat acid based polyisocyanate content. Or the derivative can be prepared from the latter, and the second component can include other polyisocyanates and, where needed, more of the polymeric fat acid based polyisocyanate. The other polyisocyanates which can be used in combination with the polymeric fat acid based polyisocyanates are any of those described hereinabove in regard to the description of the preparation of the derivative. It is especially preferred that the derivative be prepared from the polymeric fat acid based polyisocyanate and that the second component of the curable composition also consists entirely of such polyisocyanate. And it is further preferred that the said polyisocyanate is a di-isocyanate—i.e. dimeryl isocyanate.

The aldimine or ketimine blocked polyamine or derivative thereof and the polyisocyanate are preferably used in approximately equivalent amounts, the equivalents being based on the blocked primary amine groups plus any free secondary amine groups and the isocyanato groups. In general, however, the equivalent ratios can vary within the range of about 1.5:1 to 1:1.5 (polyamine reactant to polyisocyanate reactant).

The polyamine reactant and the polyisocyanate component can be applied to the metal substrate using conventional procedures. Thus they can be mixed and applied by brush or with a one component spray gun. They can also be applied using a two component spray gun. It is only necessary that they be applied in a manner to provide a reasonably uniform cured coating having a thickness of at least about 1.5 mils and preferably between about 2 and 3 mils. A diluent or solvent is not necessary and in some respects is disadvantageous since the same must be removed. However, a diluent or solvent tends to increase the pot life of the compositions where the components are admixed some time prior to use and kept under substantially anhydrous conditions. Suitable solvents include dioxane, tetrahydrofuran, xylene, toluene, mineral spirits, etc. Where a solvent is used, it is preferred that the reactive components are present in amounts between about 40 and 90% by weight.

Various fillers and pigments can be included in the compositions. Representative of such materials are amorphous silicas, titanium dioxide, carbon black, chrome yellow, phthalocyanine blue and green, toluidine red, quinacridone red, green gold, toluidine yellow, iron oxide red and fire orange red. These materials are preferably added to the polyamine component or shortly before applying the curable composition to the substrate.

Curing of the polyurea forming composition is carried out by causing the ketimine or aldimine groups to revert to primary amine groups. This can be accomplished simply by exposing the same to moisture—i.e. atmospheres containing preferably 15 to 100% relative humidity. There is also nothing critical about the curing temperatures although it is preferred that the curing takes place at room temperature or above. Elevated temperatures of about 100 to 350° C. or so can be used with consequent acceleration of the curing. However, at such higher temperatures the humidity is usually quite low and thus curing is somewhat impeded unless moisture is added such as from steam. The acrylic coating can be applied immediately after application of the polyurea coating or after the latter has become dry to the touch to fully cured. Normally, the polyurea coating becomes dry to the touch within a few minutes. The polyurea coating is dry to the touch to fully cured within about 2 minutes to 3 hours, the time depending on such factors as solvent, concentration, temperature, humidity and the presence or absence of catalyst.

Where time is important such as on production lines for automobiles and appliances, elevated temperatures are used to accelerate the curing of the various coatings. Under such conditions, it may be disadvantageous to supply sufficient humidity via steam or otherwise. Thus an inorganic halide hydrate is preferably added to the curable polyurea composition. The said compound not only accelerates the cure of the polyurea by catalysis but also provides water for the conversion of the aldimine and ketimine groups of the polyamine reactant to primary amine groups. Curable compositions of polyisocyanates and aldimines or ketimines of polyamines containing such inorganic halide hydrates are the invention of Kenneth B. Stokes and are disclosed and claimed in an application entitled "Curable Compositions of Improved Versatility and Process of Preparing Polyureas," Ser. No. 796,922, filed Feb. 5, 1969.

The heat curable (or thermosetting) acrylic coating composition can be any of those well known in the coatings art. Generally, these compositions (enamels or lacquers) are comprised of organic solvent solutions of one or more esters of acrylic acid or substituted acrylic acids such as methacrylic acid. Representative of the polymerizable monomers are methyl acrylate, ethyl acrylate, propyl acrylate, n-butyl acrylate, hexyl acrylate, 2-ethyl hexyl acrylate, n-octyl acrylate, methyl methacrylate, hexyl methacrylate, and various other esters wherein the alcohol portion is alkyl, alkenyl, cycloalkyl, terpenyl, aralkyl, or aryl or similar group containing a heteroatom as in hydroxyalkyl, alkoxyalkyl, aryloxyalkyl, alkylthioalkyl, or dialkylamidoalkyl. The organic solvents include: ketones such as acetone, methylethyl ketone, methylisobutyl ketone, diisobutyl ketone, isophorone, methyl isophorone, cyclohexanone, epoxy acetone, butoxy acetone and the like; lower alkyl esters such as methyl acetate, ethyl acetate, propyl acetate, butyl acetate and the like; aromatic hydrocarbons such as toluene, benzene, xylene, trimethyl benzene, and the like; aliphatic hydrocarbons such as heptane, petroleum hydrocarbons and the like; lower aliphatic alcohols such as ethanol, propanol and the like; and various other solvents including dioxane, Cellosolve, butyl Cellosolve, butyl Cellosolve acetate, butyl Carbitol acetate, and Cellosolve acetate. The compositions can contain cross-linking agents (such as urea or melamine formaldehyde polymers, hexa-methoxymethyl melamine and the like), polymerization inhibitors, pigments, fillers, and other polymerizable monomers containing a terminal $CH_2=C<$ group (such as styrene and vinyl toluene).

The described heat curable acrylic coating composition is applied over the polyurea coating at the times indicated. Such application can be made by conventional procedures, and especially by spray equipment. The acrylic coating composition is applied in an amount to preferably give a coating thickness of 0.5 to 2.0 mils. Curing of the said coating is preferably carried out at temperatures of about 100 to 400° F. At the higher of such temperatures, the coating is fully cured within about 5 to 30 minutes.

The metal substrate is preferably steel since the same is the most commonly used structural element in the automotive and appliance industries. The substrate can be pretreated with zinc phosphate (phosphatized) to improve adhesion of the coatings to the surface thereof. Electrophoretic primers can also be used to assist in corrosion control.

The following examples illustrate certain preferred aspects of the present invention without limiting the same thereto. In such examples, the chip resistance of the coatings was determined by testing the resistance of the coatings to falling steel shot. This test was accomplished by dropping ⅛ inch diameter round steel shot through a 20 ft. one inch steel pipe. The pipe was positioned so that impact occurred on the coated panels at a 45 degrees angle. Coating appearance was then rated on a 0 (no change) to 10 (coating completely removed) scale. The dimeryl isocyanate employed in the examples has the formula:

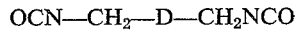

where D is the divalent hydrocarbon radical of the dimerized fat acids obtained by polymerizing and hydrogenating (in the presence of palladium catalyst) the mixture of fat acids derived from tall oil (composed of approximately 40–45% linoleic and 50–55% oleic, such percentages being by weight). The ketimine blocked polyamine reactant is a derivative of the formula:

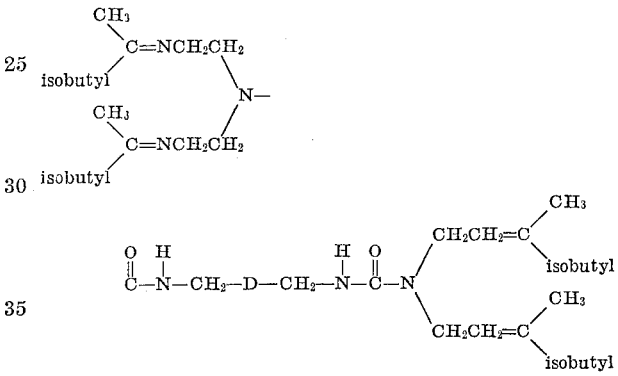

where D is as defined above. Such derivative was prepared by reacting the dimeryl isocyanate with an equivalent amount of the diketimine of diethylene triamine and methylisobutyl ketone.

EXAMPLE I

A composition prepared by mixing 300 gm. (1.00 equivalents) dimeryl isocyanate and 294 gm. (1.05 equivalents) ketimine blocked polyamine derivative was applied to a series of phosphatized steel panels with a Meyer bar and Bird applicator with coating thicknesses on various of the panels of 3.0 mils and 8.0 mils. The coated panels were baked at 360° F. (relative humidity essentially 0) for 30 minutes. At this point, some of the panels were set aside for chip resistance tests while four of the panels were spray coated with a 1.0 mil coating of an acrylic enamel (Acryloid AT–50-formulation #184). These composite coated panels were again baked at 360° F. for 30 minutes and tested for chip resistance. Three phosphatized steel panels were also spray coated with the acrylic enamel alone at varying coating thicknesses and baked at 360° F. for 30 minutes. Results of the chip resistance tests are set forth in Table I.

TABLE I

| Polyurea coating, thickness, mils | Acrylic coating, thickness, mils | Resistance to steel shot Weight, lbs. | Rating |
| --- | --- | --- | --- |
| 3.0 | | 5 | 2 |
| 3.0 | | 20 | 3 |
| 8.0 | | 25 | 0 |
| 8.0 | | 50 | 1 |
| 3.0 | 1.0 | 5 | 2 |
| 3.0 | 1.0 | 20 | 3 |
| 8.0 | 1.0 | 5 | 2 |
| 8.0 | 1.0 | 25 | 5 |
| | 0.5 | 4 | 8–9 |
| | 1.0 | 5 | 8 |
| | 3.0 | 5 | 10 |

The above data show that increasing the thickness of the acrylic coating alone does not improve chip resistance whereas the use of the polyurea undercoating significantly increases chip resistance. The composite coatings wherein a 3 mil polyurea coating is used appear to be optimum.

EXAMPLE II

Example I was essentially repeated in part using a two mil coating of the polyurea and a 1.0 mil of acrylic reflow enamel (32 J Acrylic enamel). This composite coating had a rating of 3 with 5 lbs. of steel shot. In contrast, 0.5 and 3.0 mil films of the acrylic alone gave the following ratings: 0.5 mil—ratings of 9 and 10 with 5 and 11.5 lbs. of shot, respectively; 3.0 mil—ratings of 10 and 10 with 2 and 7 lbs. of shot, respectively.

EXAMPLE III

A polyurea coating having a thickness of 5.0 mils was applied to a phosphatized steel panel with a two component spray gun using equal volumes of dimeryl isocyanate and a mixture of the ketimine blocked polyamine derivative and a 38.5% by weight solution of $CaCl_2 \cdot 6H_2O$ in Solox (industrial ethyl alcohol). The $CaCl_2 \cdot 6H_2O$ was present in an amount of 36.0 gm. per equivalent of the derivative. The coating was baked at 360° F. for 30 minutes and then a 2.0 ml coating of the acrylic reflow enamel of Example II was sprayed onto the polyurea coated panel. The composite coating, after baking at 360° F. for 30 minutes had a chip resistance rating of 2 (25 lbs. of shot).

EXAMPLE IV

A composition prepared by mixing 31.0 gm. dimeryl isocyanate and 28.0 gm. ketimine blocked polyamine derivative was applied to phosphatized steel panels with a 5.0 mil Bird applicator. While the polyurea coatings were still tacky, they were sprayed separately with 1.0 mil coatings of either acrylic composition (a) or acrylic composition (b) identified below. Phosphatized steel panels without the polyurea coatings were also sprayed with 1.0 mil coatings of the acrylics. The resulting wet coatings were baked for 20 minutes at 266° F. They were then tested for chip resistance yielding the following results:

TABLE II

| Panel No. | Coating | Resistance to steel shot Weight, lbs. | Rating |
|---|---|---|---|
| 1 | Acrylic (a) | 1 | 10 |
| 2 | Acrylic (b) | 1 | 10 |
| 3 | Polyurea plus acrylic (a) | 17.5 | 2 |
| 4 | Polyurea plus acrylic (b) | 22.5 | 3 |

The acrylic compositions (a) and (b) were prepared by first slowly adding a mixture of 40 parts hydroxyethyl methacrylate, 70 parts hydroxypropyl methacrylate, 45 parts styrene, 43 parts methyl methacrylate and 4 parts benzoyl peroxide to 200 parts refluxing Cellosolve acetate over a period of 1.25 hours (all parts by weight). The temperature was held at reflux for an additional 4 hours, then allowed to cool to yield a solution containing 48% by weight solids. A second solution was prepared by dissolving 124 gm. hexa(methoxy)methyl melamine and 3.7 gm. p-toluenesulfonic acid in 124 gm. of toluene. Acrylic composition (a) was then prepared by grinding 50 gm. of the first solution above, 60 gm. ethyl acetate and 25 gm. rutile $TiO_2$ for 60 minutes in a Red Devil Paint Shaker using glass beads. Acrylic composition (b) was then prepared by grinding 50 gm. of the first solution above, 17.5 gm. of the second solution above, 60 gm. ethyl acetate and 22.5 gm. rutile $TiO_2$ as above.

The data of this example further shows the surprising results obtained using the composite over the acrylic alone.

While the above description has been with particular reference to the specific examples, it is to be understood that the invention is not restricted thereto but may be varied within the scope of the appended claims.

The embodiments of the invention in which an exclusive property or privilege is claimed are defined as follows:

1. A process for coating metals with a composite coating having improved chip resistance which comprises: (1) applying to the surface of the metal substrate a first coating having a thickness of at least about 1.5 mils comprising an organic polyisocyanate and a polyamine reactant selected from ketimine and aldimine blocked polyamines and organic isocyanate derivatives of such blocked polyamines, said organic polyisocyanate and polyamine reactant being used in an equivalent ratio of about 1.5:1 to 1:1.5 with the equivalents being based on the isocyanato groups and the blocked primary amine groups plus any free secondary amine groups and at least about 50% of the total isocyanato groups of the organic polyisocyanate and the isocyanate used to prepare the derivative of the ketimine or aldimine blocked polyamine being obtained through the use of a polyisocyanate of the formula:

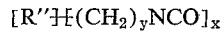

where $y$ is 0 or 1, $x$ is an integer of 2 to about 4 and R'' is the hydrocarbon group of polymeric fat acids prepared by polymerizing ethylenically unsaturated monobasic carboxylic acids having 16 to 22 carbon atoms; (2) causing aldimine and ketimine groups of the polyamine reactant to revert to free primary amine groups; (3) applying a second coating composition comprising a heat curable acrylic or methacrylic acid ester to the coated substrate; and (4) curing the composite coating at temperatures of about 100 to 360° F.

2. The process of claim 1 wherein the polyamine has the formula

where R is a difunctional aliphatic group containing from 2 to 48 carbon atoms and $n$ is an integer of 0 to 20 and the carbonyl compound used to block the primary amine groups of the polyamine has the formula

where $R_1$ and $R_2$ are hydrogen or organic radicals with the proviso that at least one of $R_1$ and $R_2$ must be an organic radical.

3. The process of claim 2 where $n$ is 0 to 2, R is an alkylene group of 2 to 6 carbon atoms and $R_1$ and $R_2$ are hydrogen or alkyl groups of 1 to 6 carbon atoms with the proviso that one of $R_1$ and $R_2$ must be an alkyl group.

4. The process of claim 1 wherein the polyamine reactant is an organic isocyanate derivative of a ketimine or aldimine blocked polyamine having at least one secondary amine group, such derivative having been prepared by reacting substantially equivalent amounts of the organic isocyanate and the ketimine or aldimine blocked polyamine, such equivalent amounts being based on the isocyanato and the secondary amine groups.

5. The process of claim 4 wherein the derivative has the formula

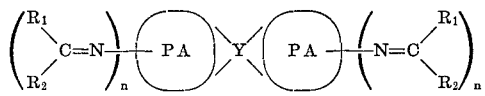

where $n$ is an integer of at least 2, $R_1$ and $R_2$ are hydrogen or alkyl groups of 1 to 6 carbon atoms with the proviso that at least one of $R_1$ and $R_2$ is an alkyl group, $\boxed{PA}$ is the residue of a polyamine exclusive of the ketimine or aldimine blocked primary amine groups and the urea linked secondary amine nitrogen or nitrogens and >Y< is

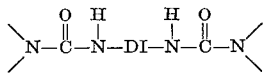

where DI is the residue of an organic diisocyanate exclusive of the isocyanato groups.

6. The process of claim 5 wherein 100% of the total isocyanato groups of the organic polyisocyanate and organic diisocyanate used to prepare the derivative of the ketimine or aldimine blocked polyamine are obtained through the use of a diisocyanate of the formula:

$$OCN-(CH_2)_y-D-(CH_2)_y-NCO$$

where y is 0 or 1 and D is the divalent hydrocarbon group of dimerized fat acids prepared by polymerizing ethylenically unsaturated monobasic carboxylic acids having 16 to 22 carbon atoms.

7. The process of claim 6 wherein the organic polyisocyanate has the formula:

$$OCN-CH_2-D-CH_2-NCO$$

and the derivative has the formula

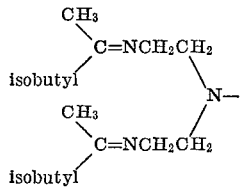

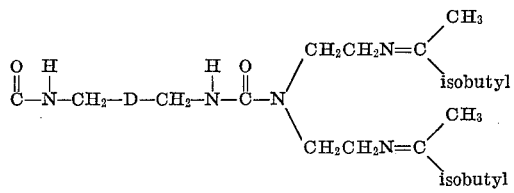

where D is the divalent hydrocarbon radical of the dimerized fat acids prepared by polymerizing the mixture of fat acids derived from tall oil composed of approximately 40–45% by weight linoleic acid and 50–55% by weight oleic acid, the diisocyanate and derivative are used in approximately equivalent amounts, the equivalents being based on the NCO and

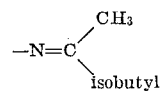

groups, the first coating has a thickness of from about 2.0 to 3.0 mils, the second coating has a thickness of from about 0.5 to 2.0 mils and the metal substrate is steel.

8. The composite coated substrate of claim 1.
9. The composite coated substrate of claim 4.
10. The composite coated substrate of claim 6.
11. The composite coated substrate of claim 7.

References Cited
UNITED STATES PATENTS

| | | |
|---|---|---|
| 2,940,872 | 6/1960 | Gusman et al. |
| 3,385,829 | 5/1968 | Heydkamp et al. |
| 3,489,744 | 1/1970 | Schwarcz et al. |
| 3,438,800 | 4/1969 | Johnson. |
| 3,481,774 | 12/1969 | Kamal et al. |

WILLIAM D. MARTIN, Primary Examiner

R. HUSACK, Assistant Examiner

U.S. Cl. X.R.

117—89, 132

PO-1050
(5/69)

UNITED STATES PATENT OFFICE
CERTIFICATE OF CORRECTION

Patent No. 3,589,932      Dated June 29, 1971

Inventor(s) Harold A. Wittcoff, Kenneth B. Stokes

It is certified that error appears in the above-identified patent and that said Letters Patent are hereby corrected as shown below:

Column 1, line 18, "5%" should read -- 50% --. Column 2, line 48, "undecyl" should read -- undecynyl --. Column 3, line 2, after "diisocyanate," (first occurrence) insert -- butylene-1,2-diisocyanate, butylene-1,3-diisocyanate, --. Column 8, line 14, that portion of the formula reading "-CH$_2$NCO" should read -- -CH$_2$-NCO --; lines 31-38, that portion of the formula reading

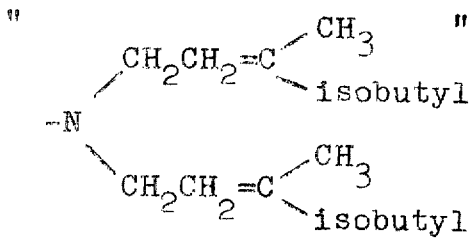 should read -- 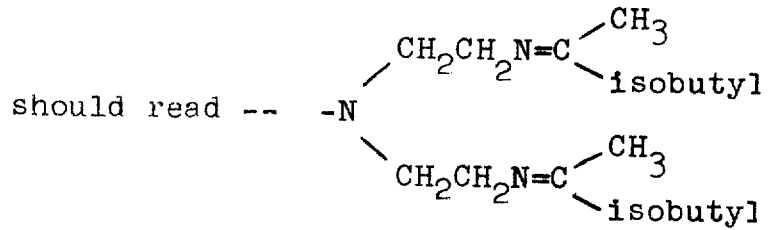

Signed and sealed this 28th day of December 1971.

(SEAL)
Attest:

EDWARD M. FLETCHER, JR.
Attesting Officer

ROBERT GOTTSCHALK
Acting Commissioner of Patents